Patented Apr. 28, 1925.

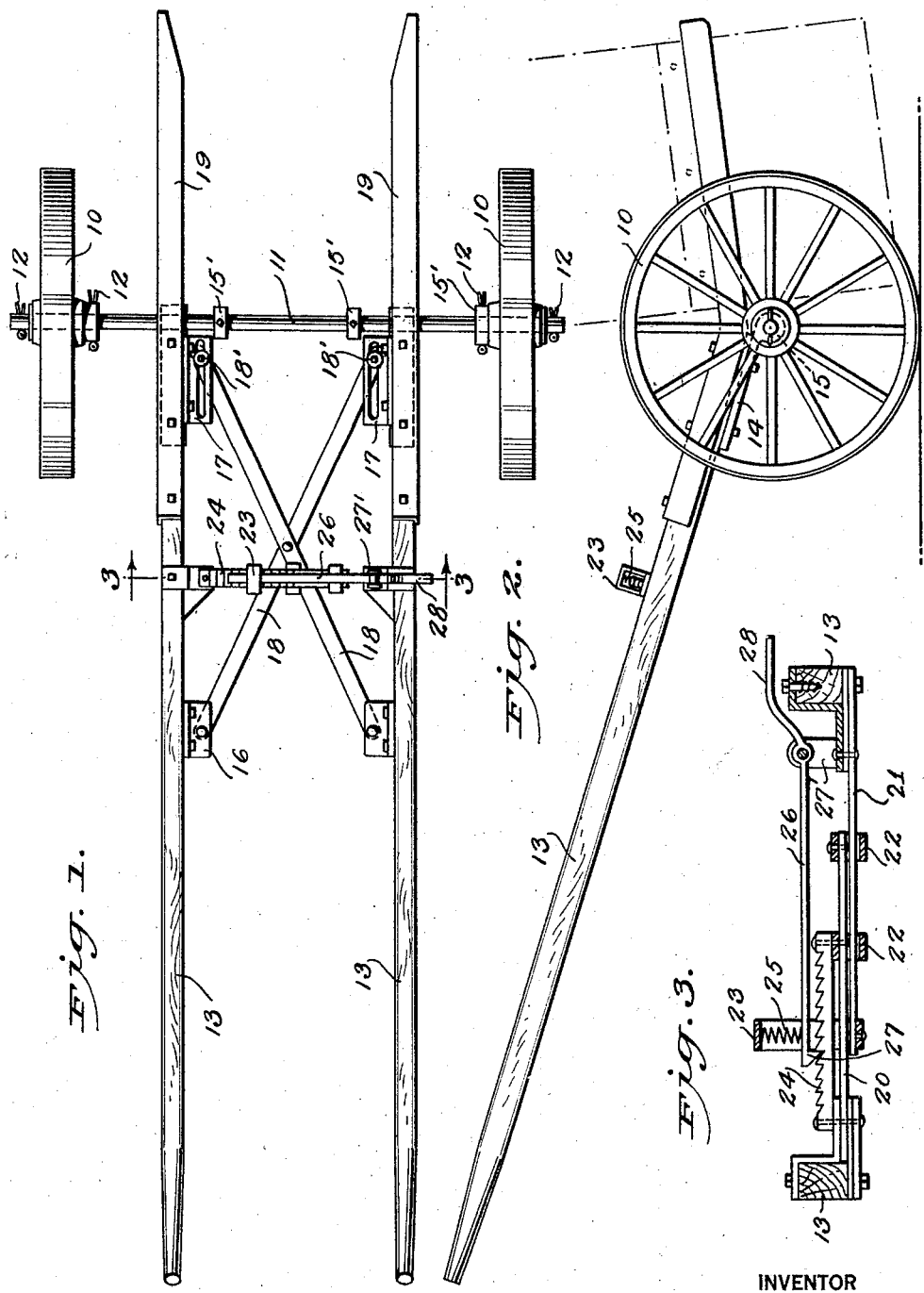

1,535,712

UNITED STATES PATENT OFFICE.

ALLEN J. BECKER, OF UPPER MONTCLAIR, NEW JERSEY.

TRUCK.

Application filed November 19, 1923. Serial No. 675,488.

*To all whom it may concern:*

Be it known that I, ALLEN J. BECKER, a citizen of the United States, residing at Upper Montclair, in the county of Essex, and State of New Jersey, have invented certain new and useful Improvements in Trucks, of which the following is a specification.

This invention relates to improvements in trucks, and more particularly to a truck designed for lifting, carrying and depositing carboys and the like, an object of the invention being to provide such a truck that will perform its functions safely, and with a minimum expenditure of time and labor.

A further object is to provide a truck of this character which can be easily and quickly adjusted to fit any width of carboy and securely locked in all positions of adjustment.

A further object is to provide a truck which can be operated to pick up a carboy, transport it, and place the same on a pouring machine without the necessity of the operator's hands touching the carboy.

With these and other objects in view, the invention consists in certain novel features of construction and combinations and arrangements of parts as will be more fully hereinafter described and pointed out in the claims.

In the accompanying drawings:—

Figure 1 is a plan view of my improved truck.

Figure 2 is a view in side elevation.

Figure 3 is enlarged transverse section on the line 3—3 of Figure 1.

Referring to the drawings the reference letters 10, 10, are used to indicate the two traction wheels of the truck. These wheels are mounted upon an axle 11 and any suitable means, such as the cotter pins 12, prevent relative sliding movement of the wheel hubs on the axle.

The forward ends of parallel handle bars 13 are pivotally connected with the axle and slidable laterally thereon. I have shown plates 14 (Fig. 2) secured to the undersides of the forward ends of the handle bars, these plates terminating in integral bearing sleeves 15 embracing the axle and affording the desired pivotal and sliding connection between the axle and the handle bars. Stops 15' on the axle limit the extent of the sliding movement of the bearing sleeves thereon.

A pair of brackets 16 are fixed to the inner faces of the handle bars intermediate their ends, and adjacent the axle a pair of slotted brackets 17 are similarly secured. In order to maintain the handle bars in parallelism, equalizing links 18 are provided. These links are pivotally secured to each other at their intermediate portions and the ends of each link are respectively pivoted to a bracket 16 on one handle bar and a bracket 17 on the other handle bar. The forward ends of each link 18 has a slot and pin connection 18' with a bracket 17. By virtue of this construction relative separation of the rear ends of the handle bars will effect relative separation of the forward ends thereof without any binding upon the axle, the crossed equalizing links acting in the manner of lazy tongs to maintain parallelism of the bars.

Forwardly extending arms 19 secured to the handle bars are adapted to engage and lift a carboy (indicated in dotted lines in Fig. 2). These arms are disposed at a slight angle relative to the handle bars so that when the truck is tilted to the normal wheeling position seen in Fig. 2, the arms 19 will be but slightly out of parallelism to the ground. The arms 19 are preferably of angle iron and their rear ends are bolted or otherwise firmly secured to the handle bars.

The manner of use of the truck is to effect relative separation of the handle bars so that the gripping arms 19 will straddle a carboy as the truck is wheeled forward advancing the handle bars toward each other then causes the arms to securely clamp under the rails of the carboy. The truck may then be tilted and wheeled about. In this connection it may be noted that the truck is particularly suitable for depositing carboys upon platforms of tilting or pouring machines such as that shown in my copending application filed of even date herewith.

The invention in this case consists partly in the construction above described and partly in the novel means which I provide for preventing accidental separation of the gripping arms and consequent dropping and breakage of the carboy. This means comprises a ratchet and dog mechanism associated with the handle bars to prevent their accidental separation.

As seen best in Fig. 3 slats 20, 21, extend inwardly from the respective handle bars, the inner free ends of such slats overlapping the loops 22 on the slat 20 to encircle the slat 21. A relatively large loop or bracket 23 on this slat 21 encircles the slat 20 and also a ratchet toothed bar 24 which is associated with the slat 20. A spring 25 within the bracket 24 bears against the free end of a lever 26 tending to urge a dog 27 integral with such lever, into engagement with the ratchet teeth. The dog is at the free end of the longer arm of the lever, said lever being fulcrumed intermediate its ends upon a bracket 27' associated with the handle bar to which slat 21 is fixed. The shorter end 28 of the lever serves as a handle for rocking the lever to effect disengagement of the dog from the teeth against the action of spring 25. It will be seen that the ratchet mechanism is adapted to positively lock the arms 19 in gripping position under the rails of various sizes of carboys, and that in order to release a carboy from the truck, lever 26 must be rocked to disengage the dog.

The handles with their attached arms constitute levers which fulcrum on the axles and move laterally on the axle to adjust them relatively to each other.

It will also be noted that when the handles are locked together they can as an entirety be moved on the axle and to facilitate the proper positioning of the arms are slightly beveled on their inner faces at their ends so that a slight cam action is permitted to cause the arms to move laterally when engaging a carboy and fix their position against the sides of the carboy without moving the truck as a whole.

Various slight changes might be made in the general form and arrangement of parts described without departing from the invention and hence I do not limit myself to the precise details set forth but consider myself at liberty to make such changes and alterations as fairly fall within the spirit and scope of the appended claim.

I claim:

A carboy supporting truck, comprising an axle, a pair of wheels supporting the axle, a pair of levers straight in plan, angular in side elevation, and mounted at their angles to pivot and slide on the axle, the ends of said bars in front of the axle being relatively short as compared to the other ends of the bars, the said shorter ends adapted to receive a carboy and said longer ends constituting handles, lazy tongs connecting the bars and maintaining them in parallel relationship in all positions of adjustment, and means connecting the bars and automatically locking them against movement away from each other but permitting their adjustment toward each other.

In testimony whereof I affix my signature.

ALLEN J. BECKER.